(12) United States Patent
Whyte

(10) Patent No.: US 10,963,746 B1
(45) Date of Patent: Mar. 30, 2021

(54) AVERAGE POOLING IN A NEURAL NETWORK

(71) Applicant: Xilinx, Inc., San Jose, CA (US)

(72) Inventor: Andrew M. Whyte, Edinburgh (GB)

(73) Assignee: XILINX, INC., San Jose, CA (US)

( * ) Notice: Subject to any disclaimer, the term of this patent is extended or adjusted under 35 U.S.C. 154(b) by 248 days.

(21) Appl. No.: 16/247,301

(22) Filed: Jan. 14, 2019

(51) Int. Cl.
| G06K 9/62 | (2006.01) |
| G06K 9/00 | (2006.01) |
| G06N 3/04 | (2006.01) |

(52) U.S. Cl.
CPC ....... G06K 9/6262 (2013.01); G06K 9/00201 (2013.01); G06N 3/04 (2013.01)

(58) Field of Classification Search
CPC ...... G06K 9/0014; G06K 9/34; G06K 9/6256; G06K 9/6262; G06K 9/0201; G06N 3/0454; G06N 3/08; G06N 3/04
See application file for complete search history.

(56) References Cited

U.S. PATENT DOCUMENTS

| 2015/0178246 A1* | 6/2015 | Herrero Abellanas ..................... G06F 17/15 708/300 |
| 2016/0086078 A1* | 3/2016 | Ji .......................... G06N 3/0454 382/157 |
| 2016/0342893 A1* | 11/2016 | Ross ....................... G06N 3/063 |
| 2017/0103302 A1* | 4/2017 | Henry ..................... G06N 3/088 |
| 2018/0165577 A1* | 6/2018 | Young .................... G06N 3/063 |
| 2019/0228268 A1* | 7/2019 | Zhang ................... G06N 3/0454 |
| 2020/0234099 A1* | 7/2020 | Wang ...................... G06F 17/16 |

* cited by examiner

Primary Examiner — Mekonen T Bekele
(74) Attorney, Agent, or Firm — Patterson + Sheridan, LLP

(57) ABSTRACT

Embodiments herein describe, when executing an average pooling operation in a neural network, scaling input operands before performing an accumulate operation. Performing average pooling in a neural network averages the values in each face of a 3D volume, thereby downsampling or subsampling the data. This can be performed by adding all the values in a face and then dividing the total accumulated value by the total values in the face. However, the order of operations in a multiply-accumulator (MAC) is reversed from the order of operations for performing average pooling. To more efficiently use the MAC, the order of operations when performing average pooling is reversed so that determining the average value for a face can be performed on a single MAC. To do so, the values in the face are first scaled by a multiplier before being summed by an accumulator.

20 Claims, 5 Drawing Sheets

AVERAGE POOLING IN A NEURAL NETWORK

TECHNICAL FIELD

Examples of the present disclosure generally relate to average pooling in a neural network, and more specifically, to scaling values before those values are accumulated using a multiply-accumulate operation.

BACKGROUND

A convolutional neural network (CNN) works on 3D volumes of data as a consequence of convolving a 2D input with a number of different 'filters' (also known as weights or parameters) and concatenating the result of these convolutions. Each filter is the result of training the network against a dataset, and through convolution, can extract features, such as edges, from a region of the input. A CNN processes an input color image with three channels (RGB). Equally, however, a CNN's input data could be single-channel like audio data, or a black and white 2D image. Performing convolution with multiple filters and then concatenating those results yields a 3D volume which could be processed further by subsequent layers. A pooling operation performs a form of downsampling/subsampling of a larger 3D volume to yield a 3D volume of reduced dimensions.

One pooling operation is average pooling where the values in each face (or 2D slice) of the 3D volume are averaged to yield a single result. For example, a 3D volume with a height, width, and depth of 7×7×1024 can be converted into a 1×1×1024 output vector (e.g., a one-dimensional vector). Stated differently, the 3D volume is converted into a vector of average values where each value is the average of the values in one face of the volume (where the volume has 1024 faces in the example). However, the algorithm for performing average pooling might not match the underlying hardware structure that generates the vector of average values.

In some implementations, average pooling is not performed over the full face of the 3D volume, but over a sub region, which results in an output 3D volume with the same or reduced dimensions (in the case of downsampling). For example, rather than averaging all the values in the face into one value, a 2×2 pooling region could be selected which is then swept through the 3D volume to generate a plurality of average values (one for each 2×2 subregion in the face) which reduces the height and width of the faces in the 3D volume.

SUMMARY

Techniques for performing average pooling using a multiply-accumulate operation are described. One example is a method for performing average pooling in a neural network using a multiplier-accumulator (MAC). The method includes receiving a 3D volume at a multiplexer in the MAC, wherein the 3D volume is generated by the neural network, iteratively selecting values from a first face in the 3D volume using the multiplexer, wherein an output of the multiplexer is coupled to an input of a multiplier in the MAC, scaling each of the selected values with a scaling factor using the multiplier where the scaling factor is based on a total number of values in the first face, iteratively accumulating each of the scaled values using an accumulator in the MAC, and outputting an average value of the first face from the accumulator.

One example described herein is a MAC that includes a multiplexer configured to receive a 3D volume generated by a neural network and iteratively selecting values from a first face in the 3D volume, a multiplier with a first input coupled to an output of the multiplexer and a second input configured to receive a scaling factor where the scaling factor is based on a total number of values in the first face, where the multiplier is configured to multiply the selected values to the scaling factor, and an accumulator configured to accumulate the scaled values and output an average value of the first face.

One example described herein is a system that includes a neural network including a plurality of layers, where at least one of the layers performs average pooling and an integrated circuit. The integrated circuit includes a multiplexer configured to receive a 3D volume generated by the neural network and select values from a first face in the 3D volume, a multiplier is configured to multiply the selected values to a scaling factor, and an accumulator configured to accumulate the scaled values and output an average value of the first face as part of performing average pooling in the neural network.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
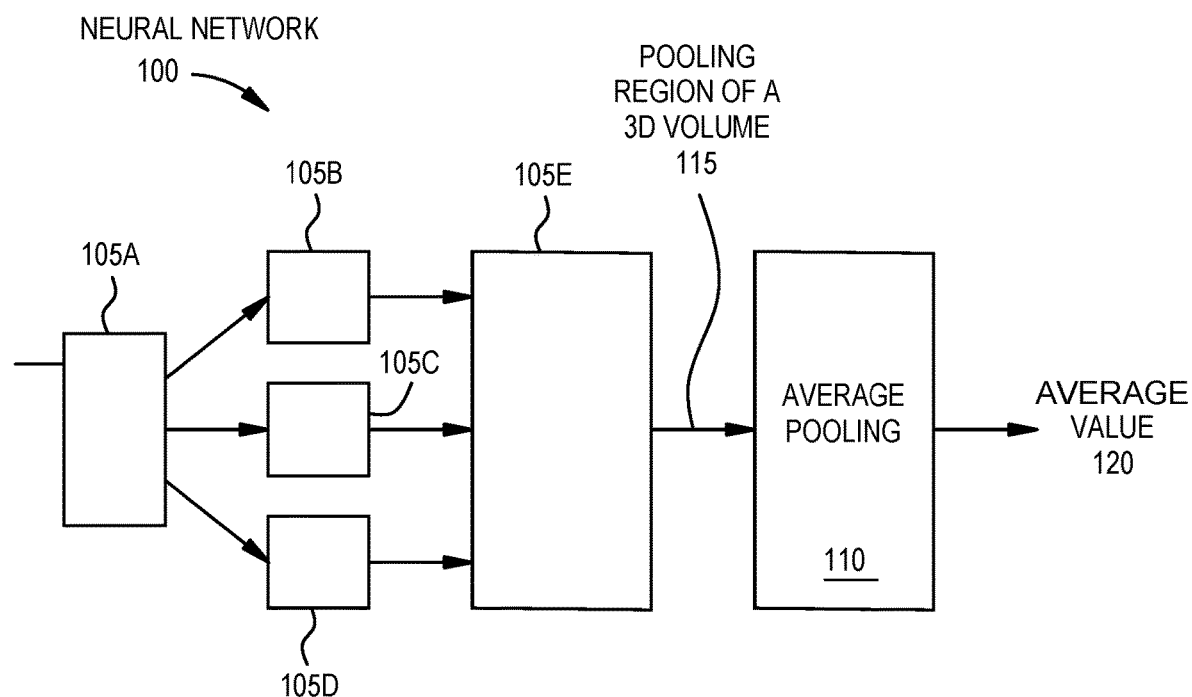
FIG. 1 illustrates a neural network with functions performed by an integrated circuit, according to an example.
Figure 1:
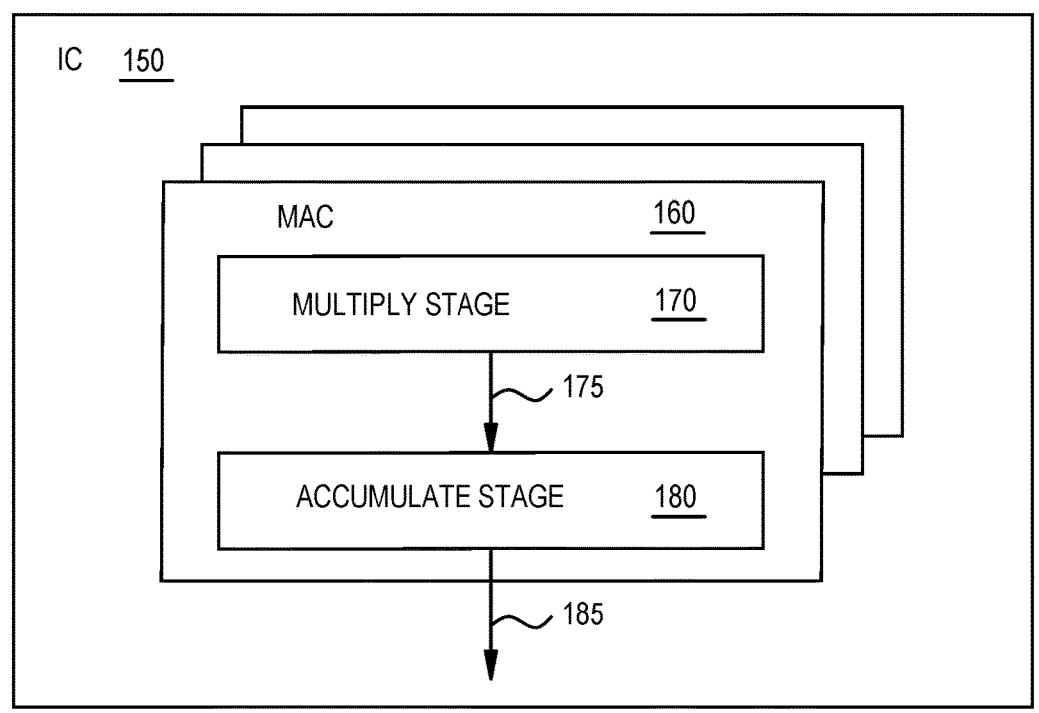

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

The embodiments herein describe, when executing an average pooling operation in a neural network, scaling input operands before performing an accumulate operation. As described above, average pooling averages the values in each face of a 3D volume to output a downsampled version of the faces, thereby downsampling (or subsampling) the data. This can be performed by adding all the values in a face (e.g., a 7×7 face would have 49 values) and then dividing the total accumulated value by the total values in the face—e.g., 49. Moreover, the same process can be performed in a pooling subregion in the face rather than a full face. Thus, average pooling described herein can be used in any pooling region of a face which can include all of the values in the face or a subportion of the values in the face.

However, the hardware available in an IC is often a multiplier-accumulator (MAC) which includes a multiplier that first scales input value before those values are summed by an accumulator. However, this order of operation is reversed from the order of operation for performing average pooling where the values are first accumulated and then scaled (e.g., divided by the size of the face). Thus, some hardware implementations use the accumulator in a first MAC to first sum the values in a face and then outputs the accumulated value to a multiplier in a second MAC. Thus, in this example, averaging pooling is performed using at least two MACs.

In the embodiments herein, the order of operations when performing average pooling is reversed so that average pooling is performed on a single MAC. To do so, the values in the face are first scaled by the multiplier before being summed by the accumulator in the MAC. Using the example above, each value of the 7×7 face is first multiplied by the reciprocal of the total value (e.g., ¹⁄₄₉) before the accumulator adds the scaled value to the other scaled values of the face, thereby resulting in the average value of the face. Reversing the operations means only one MAC is used which frees up other MACs to perform other operations, such as performing average pooling on other faces in the 3D volume in parallel.

However, scaling the values in the face before they are accumulated can result in error growth when many scaled values are accumulated due to error introduced by scaling. But the typical size of the faces of the 3D volumes in neural networks are small (e.g., 49 for a 7×7 face, 64 for a 8×8 faces, 81 for a 9×9 face, etc.) which means the error from first scaling the values is small and bounded. Nonetheless, to further reduce any impact of the error from scaling the values before they are accumulated, in one embodiment, the MAC includes a memory that stores high-precision scaling factors. For example, rather than using an 8-bit representation of the scaling factor of the face (e.g., ¹⁄₄₉ for a 7×7 face), the memory can store a pre-computed high-precision representation of the scaling factor. Control logic can select the high-precision scaling factor from the memory element depending on the current size of the face of the 3D volume. Using a predefined (and high-precision) scaling factor takes advantage of the wide integer data paths often available in the multiplier in the MAC which reduces the error caused by first scaling and then accumulating the values.

FIG. 1 illustrates a neural network 100 with functions performed by an integrated circuit 150, according to an example. In one embodiment, the neural network 100 is a convolutional neural network (CNN), but is not limited to such. In one embodiment, the neural network 100 is any artificial neural network that includes average pooling 110.

In FIG. 1, the neural network 100 has multiple layers where each layer includes one or more functions 105. For example, a first layer includes the function 150A while a second layers includes the functions 105B-105D. The functions represent different operations such as convolution, normalization, pooling (both max-pooling and average pooling 110), input/output functions, and the like.

Average pooling 110 receives a pooling region of a 3D volume 115 and converts it into an average value 120. In one embodiment, if the size of the pooling region is the size of the face, average pooling 110 averages the values of each face of the 3D volume to determine an average value 120 which can be stored in a vector. That is, if the 3D volume has a depth of 1024 (e.g., 1024 faces), average pooling 110 results in a vector with a 1024 entries. In another embodiment, the pooling region of the 3D volume 115 may be a subset of the values in the face. In that case, the average pooling 110 outputs an average value 120 for each pooling region in a face. The average values can be grouped to result in a downsampled version of the face (e.g., a 6×6 face is reduced to 3×3 face). This downsampling can be performed for each face in the 3D volume. The algorithm for performing average pooling is represented by the following psuedo-code where a 3D volume has a height (H), width (W), and depth (D):

for (d=0; d<D; d++)
  B=0
  for (h=0; h<H; h++)
    for (w=0; w<W; w++)
      B=B+A(h,w,d)
    end
  end
  C(d)=B/(H*W)//alternatively could be expressed as
    C(d)=B*(1/H*W))
end This psuedo-code indicates that for each depth value (i.e., each face), the values at the depth (which correspond to different heights and widths in the face) are summed or accumulated using the second and third for loops. Once the total value of the pooling region is identified (i.e., the value of B), that value is divided by the size of the pooling region (i.e., H*W) to result in the average of the values in the pooling region. The first for loop indicates that this process can continue for all the faces in the 3D volume.

The IC 150 includes a MAC 160 for performing average pooling 110. In this example, the MAC 160 includes a multiply stage 170 which has an output 175 that is an input of an accumulate stage 180. An output 185 of the accumulate stage 180 is the output of the MAC 160. Thus, the MAC 160 first inputs data into the multiply stage 170 which scales the values before transmitting the scaled values to the accumulate stage 180. This, however, is reverse from the order of operations of average pooling 110 as described in the psuedo-code above. To perform average pooling 110 according to the psuedo-code, the accumulate stage 180 in a first MAC would be used to add the values in the face which is then transmitted to a multiply stage 170 in a second, downstream MAC 160 to determine the average of the values in that pooling region. As mentioned above, this is sub-optimal use of the MACs in the IC 150.

Instead, the embodiments herein first scale the values of the pooling region using the multiply stage 170 before summing those values using the accumulate stage 180. For example, the multiply stage 170 can multiply each value of the face by the reciprocal of the size of the pooling region (e.g., ¹⁄₆₄ for a 8×8 pooling region) before adding that scaled value to previously scaled values. After doing this for each value in the pooling region, the output 185 of the accumulate stage 180 is the average value of the pooling region. As such, performing average pooling 110 for a particular pooling region in a face in the 3D volume 115 can be performed using a single MAC 160.

If the pooling region is a subregion in the 3D volume—e.g., the pooling region is a 2×2 block of values within a 6×6 face—the MAC 160 can repeat the process above for each 2×2 block of values in the face. Stated differently, the 6×6 face can be subdivided into a plurality of 2×2 blocks where average pooling is performed for each block as described above. Thus, each 2×2 block in the face is replaced with a corresponding average value.

Figure 2:
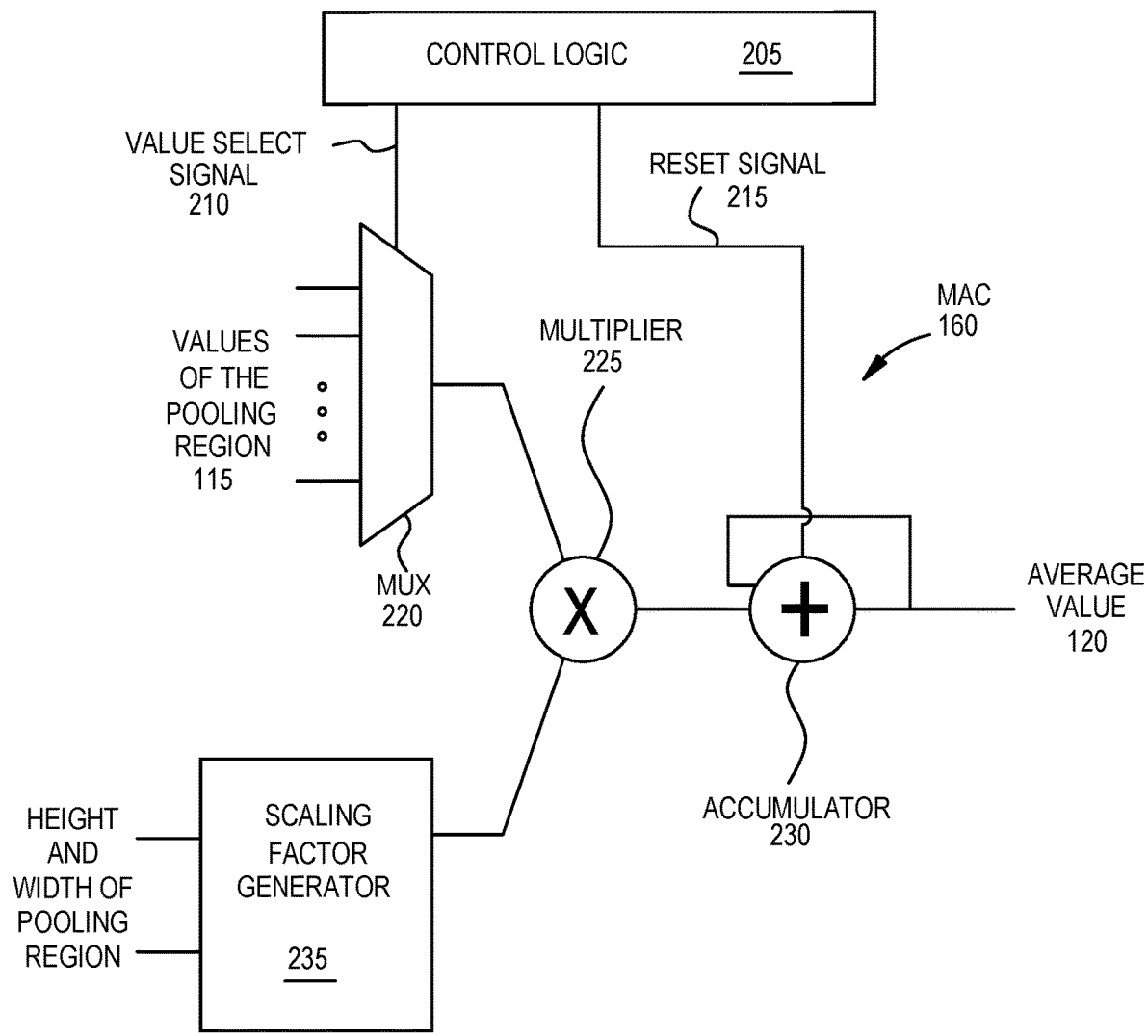
FIG. 2 is a block diagram of circuitry for performing a multiply-accumulate operation, according to an example.

FIG. 2 is a block diagram of circuitry of a MAC 160 that performs a multiply-accumulate operation, according to an example. FIG. 2 illustrates control logic 205, a multiplexer (mux) 220, a multiplier 225, an accumulator 230, and a scaling factor generator 235. The control logic 205 generates a value select signal 210 and a reset signal 215. The value select signal 210 controls the mux 220 to select one of the values in the 3D volume 115. For example, the inputs of the mux 220 may be connected to the output of the hardware that executes the previous layer in the neural network that generates the 3D volume. As discussed below, the control logic 205 uses the value select signal 210 to select each of the values in a pooling region in each face of the 3D volume 115 in order to identify the average value of each pooling region. However, this multiplexing does not need to be a discrete multiplexer as shown in FIG. 2, but could be a memory/RAM which delivers the required data through addressing. That is, in other embodiments, the mux 220 may be omitted and the desired values can be retrieved from memory.

The mux 220 outputs the selected value to the multiplier 225 (e.g., a first stage in the MAC 160) which scales the value using an output of the scaling factor generator 235. In this embodiment, the scaling factor generator 235 receives the height and width of the pooling region and calculates the size of each pooling region (i.e., the number of values in each pooling region). The scaling factor generator 235 can then calculate the reciprocal of the size of the pooling region which is then transmitted to the multiplier 225 to be multiplied with the value selected by the mux 220. For example, for a 7×7 pooling region the generator 235 outputs ⅟49 as the scaling factor, for a 8×8 pooling region the generator 235 outputs ⅟64 as the scaling factor, for a 9×9 pooling region the generator 235 outputs ⅟81 as the scaling factor, and so forth.

The scaled value is then transmitted to the accumulator 230 (e.g., a second stage in the MAC 160) which adds the scaled value to the summation of the previous scaled values for the pooling region. Put differently, the accumulator 230 maintains a running sum of the scaled values. Once all the scaled values have been summed, the final output of the accumulator—which is the average of the value in the face—is output as the average value of the pooling region. The control logic 205 can use the reset signal 215 to reset or clear the accumulator so another pooling region in the same face, or another face of the 3D volume, can then be averaged.

Figure 3:
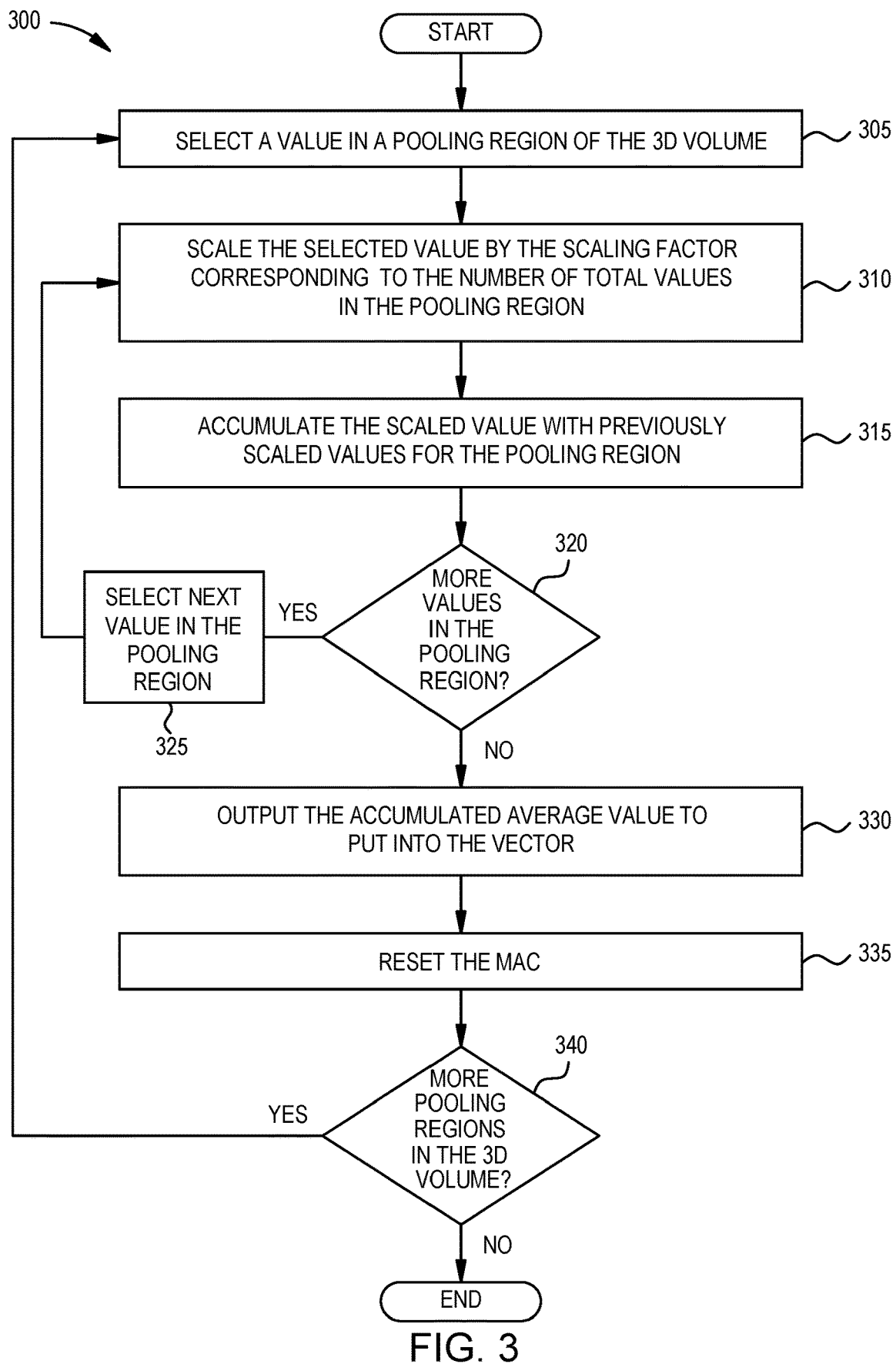
FIG. 3 is a flowchart for performing average pooling using a multiply-accumulate operation, according to an example.

FIG. 3 is a flowchart of a method 300 for performing average pooling using a multiply-accumulate operation, according to an example. For clarity, the blocks in method 300 are discussed in tandem with the circuit elements described in FIG. 2. The method 300 starts at block 305 where the mux 220, in response to the value select signal 210 from the control logic 205, selects a value in a pooling region of the 3D volume 115. For example, the value select signal 210 can include height values, width values, and depth values which select one of the values in the 3D volume 115. To select all the values in a particular pooling region, the depth value would remain the same but the control logic 205 provides different height and width values so that all the values in the pooling region are selected at respective times by the mux 220.

At block 310, the multiplier 225 scales the selected value by the scaling factor corresponding to the number of total values in the pooling region. In one embodiment, the scaling factor generator 235 calculates (or receives) the total number of values in the pooling regions and then outputs the reciprocal of that number as the scaling factor. The multiplier 225 multiplies the scaling factor with the selected value to result in the scaled value.

At block 315, the accumulator 230 accumulates the scaled value with previously scaled values for the pooling region. That is, the accumulator 230 maintains the running total or sum of the scaled values for a particular pooling region in the 3D volume.

At block 320, the control logic 205 determines whether there are more values in the pooling region that have not yet been scaled and accumulated. If so, the method 300 proceeds to block 325 where the control logic 205 uses the value select signal 210 to instruct the mux 220 to select the next value in the pooling region. For example, the control logic 205 may raster through the face row-by-row or column-by-column until all the values have been selected.

However, once all the values have been scaled and accumulated, the method 300 proceeds to block 330 where the accumulator 230 outputs the accumulated average value of the pooling region. The average value can be used to create a downsampled version of the face—e.g., a face with smaller height and widths, or a single value if the pooling region is the same size as the face.

At block 335, the control logic 205 resets the MAC. In one embodiment, the control logic 205 uses the reset signal 215 to clear the accumulator 230—e.g., reset the accumulator 230 so that previously calculated accumulated value is erased.

At block 340, the control logic 205 determines whether there are more pooling regions in the current face to be evaluated. If the pooling region is small than the face, the pooling region is swept across the face until average pooling has been performed in all the subregions of the face. If the method 300 has not evaluated all the pooling regions in a face, the method 300 returns to block 305 to evaluate the pooling region for the next face in the 3D volume. Further, if the control logic 205 has considered all the pooling regions in the current face, the logic 205 can select a new face and repeat method 300 (assuming there is another face in the 3D volume). Each time the method 300 iterates, the accumulator adds a new average value which can be used to generate a downsampled version of the face.

In another embodiment, the average values of the pooling regions in the 3D volume can be calculated in parallel using multiple MACs. For example, a first MAC may calculate the average value of a pooling region in a first face in the 3D volume while in parallel a second MAC calculates the average value of a pooling region in a second face in the same 3D volume. Thus, the IC can calculate multiple average values in parallel. For example, if there are sixteen available MACs in the IC, the IC can calculate average values for pooling regions in sixteen of the faces in a 3D volume simultaneously.

Figure 4:
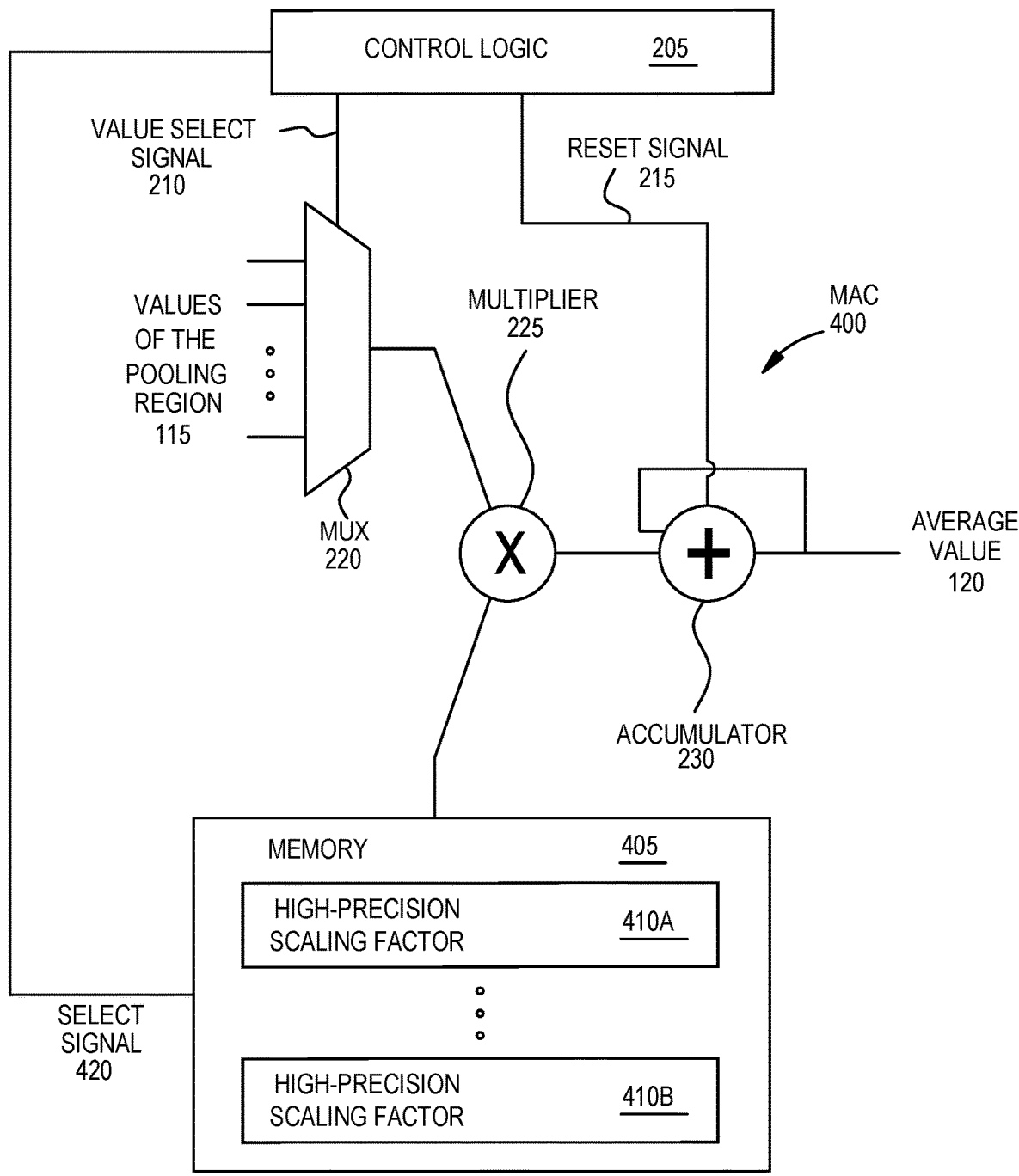
FIG. 4 is a block diagram of circuitry for performing a multiply-accumulate operation, according to an example.

FIG. 4 is a block diagram of circuitry of a MAC 400 for performing a multiply-accumulate operation, according to an example. The MAC 400 includes many of the same circuitry and signals as the MAC 160 illustrated in FIG. 2.

The description of these common elements is not repeated here. However, the MAC 400 differs from the MAC 160 in FIG. 2 in that the scaling factor generator 235 is replaced by a memory 405 (e.g., a read-only memory (ROM)) which stores high-precision scaling factors 410. That is, while the scaling factor generator 235 uses the height and width of the faces in the 3D volume to calculate a scaling factor (e.g., the reciprocal of the total number of values in the face), the memory 405 contains pre-computed (or predefined) high-precision scaling factors 410.

The control logic 205 can use a select signal 420 to instruct the memory 405 to output one of the high-precision scaling factors 410 to the multiplier 225. In one embodiment, each of the high-precision scaling factors 410 corresponds to different pooling region size. For example, the scaling factor 410A may correspond to 7×7 pooling region, the scaling factor 410B corresponds to a 8×8 pooling region, and so forth. Depending on the pooling region size of the current 3D volume, the control logic 205 can instruct the memory 405 to output the corresponding scaling factor 410.

Using pre-computed high-precision scaling factors 410 can reduce negative effects from scaling the values before accumulating the values when performing average pooling. That is, scaling the values in the pooling region before those scale values are accumulated can result in error growth when the number of accumulations is large. However, the typical sizes of the pooling regions of the 3D volumes in neural networks are small (e.g., less than 100). For example, a 7×7 pooling region has a size of 49, a 8×8 pooling region has a size of 64, a 9×9 pooling region of size 81, etc. As such, the error introduced from first scaling the values is small and bounded. Nonetheless, to further reduce any impact of the error, the MAC 400 includes the memory 405 that stores the high-precision scaling factors 410. For comparison, the scaling factor generator 235 in FIG. 2 may output an 8-bit scaling factor while the high-precision scaling factors 410 stored in the memory 405 in FIG. 4 may be, for example, an 18-bit or 24-bit representation of the scaling factor. The precision (i.e., the number of bits) of the high-precision scaling factor 410 can vary depending on the input data widths of the multiplier 225. That is, multipliers 225 with wider input data paths can take advantage of more precise scaling factors 410 (e.g., scaling factors 410 with more bits) than multipliers 225 that have smaller data paths. In summary, rather than using an 8-bit representation of the scaling factor of the pooling region (e.g., 1/49 for a 7×7 pooling region), the memory can store a pre-computed 18-bit or 24-bit high-precision representation of the scaling factor.

In one embodiment, the control logic 205 selects the high-precision scaling factor 410 from the memory 405 depending on the current size of the face of the 3D volume 115. Using a predefined (and high-precision) scaling factor takes advantage of the wide integer data paths often available in the multiplier 225 in the MAC 400 which reduces the error caused by first scaling and then accumulating the values as described above.

Figure 5:
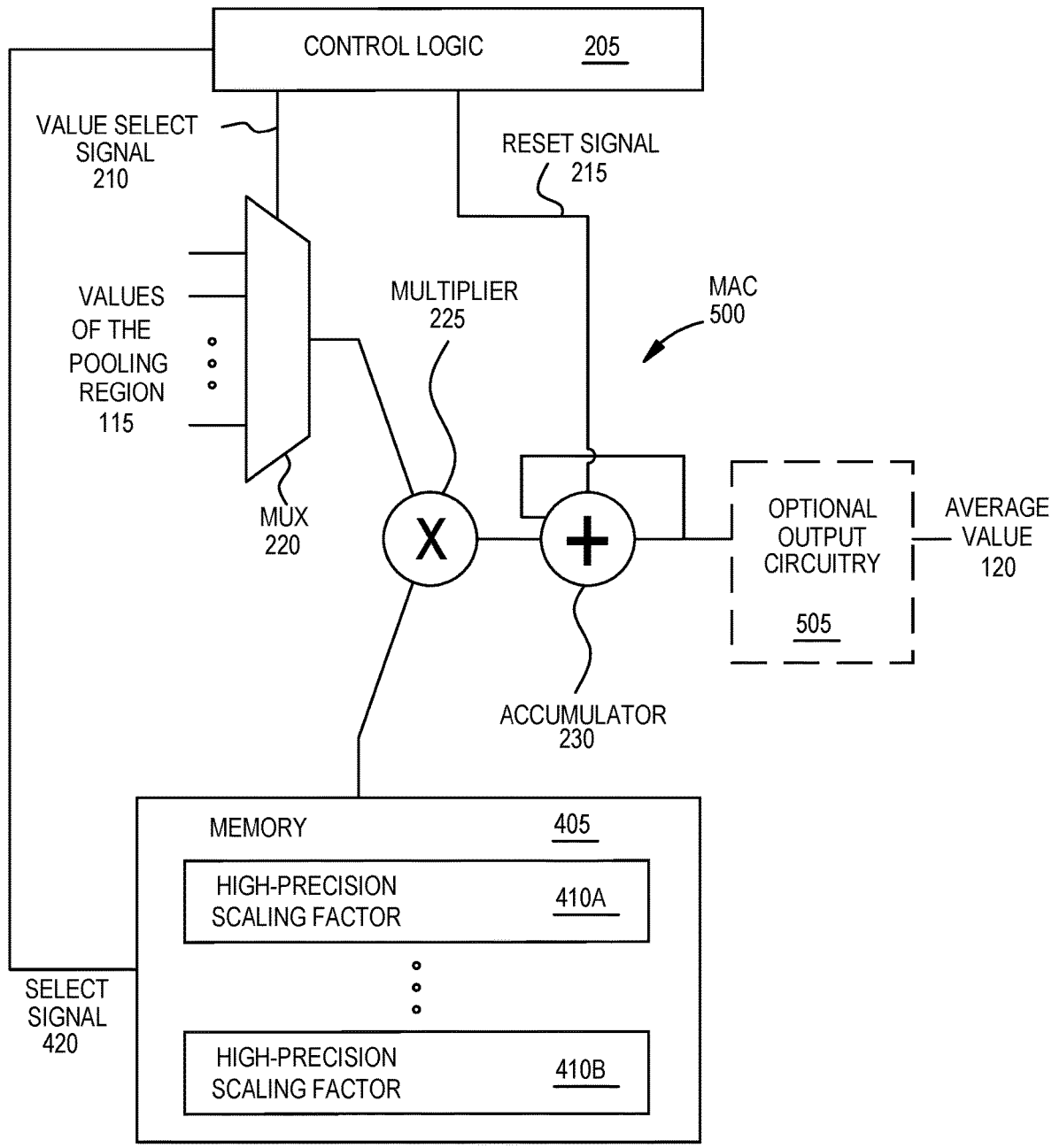
FIG. 5 is a block diagram of circuitry for performing a multiply-accumulate operation, according to an example.

FIG. 5 is a block diagram of circuitry for performing a multiply-accumulate operation, according to an example. The MAC 500 in FIG. 5 includes many of the same elements as in FIG. 4, which are not described further here. However, the MAC 500 differs from the MAC 400 in that the MAC 500 includes optional output circuitry 505 coupled to the output of the accumulator 230. Rather than the average value of the pooling region (as calculated by the accumulator 230) being outputted, the average value of the pooling region is first provided to the optional output circuitry 505.

In one embodiment, the optional output circuitry 505 can perform any number of functions. For example, the circuitry 505 may include one or more scaling stages, one or more rounding stages, and/or one or more saturation stages. The number of these stages in the optional output circuitry 505 may vary depending on the accuracy requirements of the neural network being implemented. In one embodiment, the accuracy required depends on the location of the average pooling function within the neural network.

In FIG. 5, the optional output circuitry 505 is part of the hardware in the MAC 500. Stated differently, the circuitry 505 is formed from hardened (or non-programmable) logic in the IC. In another embodiment, the IC includes programmable logic (e.g., the IC forms a field programmable gate array (FPGA)). In that scenario, the optional output circuitry 505 may be formed using programmable logic in the FPGA rather than hardened logic. For example, the output of the accumulator 230 can be routed to a portion of the FPGA containing the programmable logic that includes the scaling, rounding, and saturation stages. Other portions of the MAC 500 (e.g., the multiplier 225 and accumulator 230) may be formed using hardened logic circuitry.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A method for performing average pooling in a neural network using a multiplier-accumulator (MAC), the method comprising:
   receiving a 3D volume at a multiplexer in the MAC, wherein the 3D volume is generated by the neural network;
   iteratively selecting values from a first pooling region in a first face in the 3D volume using the multiplexer, wherein an output of the multiplexer is coupled to an input of a multiplier in the MAC;
   scaling each of the selected values with a scaling factor using the multiplier, wherein the scaling factor is based on a total number of values in the first pooling region in the first face;
   iteratively accumulating each of the scaled values using an accumulator in the MAC; and
   outputting an average value of the first pooling region in the first face from the accumulator.

2. The method of claim 1, further comprising:
   resetting the accumulator;
   iteratively selecting values from a second pooling region in the first face in the 3D volume using the multiplexer;
   scaling each of the selected values from the second pooling region in the first face with the scaling factor using the multiplier;
   iteratively accumulating each of the scaled values of the second pooling region in the first face using the accumulator in the MAC; and
   outputting an average value of the second pooling region in the first face from the accumulator.

3. The method of claim 1, further comprising:
   determining, using the MAC, an average value for a pooling region in each face in the 3D volume; and
   storing the average values thereby downsampling each face.

4. The method of claim 1, wherein the scaling factor is based on a reciprocal of the total number of values in the first pooling region in the first face.

5. The method of claim 1, further comprising:
selecting the scaling factor from a plurality of high-precision scaling factors stored in memory, wherein an output of the memory is coupled to the input of the multiplier, wherein each of the high-precision scaling factors corresponds to a different pooling region size, and wherein the high-precision scaling factors are pre-defined before average pooling is performed.

6. The method of claim 5, wherein the different pooling region sizes correspond to different possible combinations of height and widths of 3D volumes in the neural network.

7. The method of claim 1, wherein the neural network is a convolutional neural network (CNN).

8. The method of claim 1, further comprising:
receiving the 3D volume at a multiplexer in a second MAC;
iteratively selecting values from a second pooling region in a second face in the 3D volume using the multiplexer in the second MAC, wherein the output of the multiplexer in the second MAC is coupled to an input of a multiplier in the second MAC;
scaling each of the selected values from the second pooling region in the second face with the scaling factor using the multiplier in the second MAC; and
iteratively accumulating each of the scaled values of the second pooling region in the second face using an accumulator in the second MAC, wherein iteratively selecting values, scaling, and iteratively accumulating using the second MAC is performed in parallel with iteratively selecting values, scaling, and iteratively accumulating using the MAC.

9. A MAC, comprising:
a multiplexer configured to receive a 3D volume generated by a neural network and iteratively selecting values from a first pooling region in a first face in the 3D volume;
a multiplier with a first input coupled to an output of the multiplexer and a second input configured to receive a scaling factor, wherein the scaling factor is based on a total number of values in the first pooling region in the first face, wherein the multiplier is configured to multiply the selected values to the scaling factor; and
an accumulator configured to accumulate the scaled values and output an average value of the first pooling region in the first face.

10. The MAC of claim 9, further comprising:
control logic configured to reset the accumulator after outputting the average value of the first face,
wherein the multiplexer is configured to iteratively select values from a second pooling region in the first face in the 3D volume,
wherein the multiplier is configured to scale each of the selected values from the second pooling region in the first face with the scaling factor,
wherein the accumulator is configured to:
iteratively accumulate each of the scaled values of the second pooling region in the first face, and
output an average value of the second pooling region in the first face.

11. The MAC of claim 9, wherein the MAC is configured to determine an average value for a pooling region in each face in the 3D volume and store the average values thereby downsampling each face.

12. The MAC of claim 9, wherein the scaling factor is based on a reciprocal of the total number of values in the first face.

13. The MAC of claim 9, further comprising:
a memory storing a plurality of high-precision scaling factors, wherein an output of the memory is coupled to an input of the multiplier, wherein each of the high-precision scaling factors corresponds to a different pooling region size, and wherein the high-precision scaling factors are pre-defined before average pooling is performed in the neural network.

14. The MAC of claim 13, wherein the different pooling region sizes correspond to different possible combinations of height and widths of 3D volumes in the neural network.

15. The MAC of claim 9, further comprising:
output circuitry coupled to an output of the accumulator, wherein the output circuitry comprises at least one of a scaling stage, a rounding stage, and a saturation stage, wherein the output circuitry is configured to modify the average value output by the accumulator.

16. A system comprising:
a neural network comprising a plurality of layers, wherein at least one of the layers performs average pooling; and
an integrated circuit, comprising:
a multiplexer configured to receive a 3D volume generated by the neural network and select values from a first pooling region in a first face in the 3D volume;
a multiplier is configured to multiply the selected values to a scaling factor; and
an accumulator configured to accumulate the scaled values and output an average value of the first pooling region in the first face as part of performing average pooling in the neural network.

17. The system of claim 16, wherein the integrated circuit further comprises:
control logic configured to reset the accumulator after outputting the average value of the first pooling region in the first face,
wherein the multiplexer is configured to select values from a second pooling region in the first face in the 3D volume,
wherein the multiplier is configured to scale each of the selected values from the second pooling region in the first face with the scaling factor,
wherein the accumulator is configured to:
accumulate each of the scaled values of the second pooling region in the first face, and
output an average value of the second pooling region in the first face.

18. The system of claim 16, wherein the integrated circuit is configured to determine an average value for a pooling region in each face in the 3D volume and store the average values thereby downsampling each face.

19. The system of claim 16, wherein the integrated circuit comprises:
a memory storing a plurality of high-precision scaling factors from which the scaling factor is selected, wherein an output of the memory is coupled to an input of the multiplier, wherein each of the high-precision scaling factors corresponds to a different pooling region size, and wherein the high-precision scaling factors are pre-defined before average pooling is performed.

20. The system of claim 16, wherein the integrated circuit further comprises:
output circuitry coupled to an output of the accumulator, wherein the output circuitry comprises at least one of a scaling stage, a rounding stage, and a saturation stage, wherein the output circuitry is configured to modify the average value output by the accumulator.

\* \* \* \* \*